United States Patent
De La Guardia Gonzalez et al.

(10) Patent No.: US 10,909,864 B2
(45) Date of Patent: Feb. 2, 2021

(54) DRONE OBSTACLE AVOIDANCE USING REAL-TIME WIND ESTIMATION

(71) Applicant: Intel Corporation, Santa Clara, CA (US)

(72) Inventors: Rafael De La Guardia Gonzalez, Guadalajara (MX); Daniel Pohl, Saarbrücken (DE); David Gomez Gutierrez, Tlaquepaque (MX); Andreas Hippelein, Bavaria (DE); Leobardo Campos Macias, Guadalajara (MX); Rodrigo Aldana Lopez, Zapopan (MX); Jose Parra Vilchis, Guadalajara (MX); Jan Willem Vervoorst, Gauting (DE)

(73) Assignee: Intel Corporation, Santa Clara, CA (US)

( * ) Notice: Subject to any disclaimer, the term of this patent is extended or adjusted under 35 U.S.C. 154(b) by 279 days.

(21) Appl. No.: 16/020,338

(22) Filed: Jun. 27, 2018

(65) Prior Publication Data
US 2019/0051195 A1 Feb. 14, 2019

(51) Int. Cl.
| G05D 1/00 | (2006.01) |
| G08G 5/04 | (2006.01) |
| G08G 5/00 | (2006.01) |
| G05D 1/02 | (2020.01) |
| B64C 39/02 | (2006.01) |
| G05D 1/08 | (2006.01) |
| G08G 5/02 | (2006.01) |

(52) U.S. Cl.
CPC .......... *G08G 5/045* (2013.01); *B64C 39/024* (2013.01); *G05D 1/0204* (2013.01); *G05D 1/0825* (2013.01); *G08G 5/0008* (2013.01); *G08G 5/0021* (2013.01); *G08G 5/0039* (2013.01); *G08G 5/0091* (2013.01); *B64C 2201/024* (2013.01); *B64C 2201/141* (2013.01); *G08G 5/0065* (2013.01); *G08G 5/025* (2013.01)

(58) Field of Classification Search
CPC .... G08G 5/045; G08G 5/0021; G08G 5/0039; G08G 5/0008; G08G 5/0091; G08G 5/0065; G08G 5/025; G05D 1/0204; G05D 1/0825; G05D 1/0615; G05D 1/00; B64C 39/024; B64C 2201/141; B64C 2201/024; B64C 2201/14
USPC .............................. 701/3, 7, 10, 14; 348/114
See application file for complete search history.

(56) References Cited

U.S. PATENT DOCUMENTS

| 9,630,713 B1* | 4/2017 | Von Novak, III | ...... B64C 25/52 |
| 10,023,323 B1* | 7/2018 | Roberts | ................ B64C 39/024 |
| 2010/0084513 A1* | 4/2010 | Gariepy | ................ B64C 39/024 244/190 |

(Continued)

OTHER PUBLICATIONS

Premerlani, William, "IMU Wind Estimation (Theory)", (Dec. 12, 2009), 3 pgs.

*Primary Examiner* — Shardul D Patel
(74) *Attorney, Agent, or Firm* — Schwegman Lundberg & Woessner, P.A.

(57) ABSTRACT

System and techniques for drone obstacle avoidance using real-time wind estimation are described herein. A wind metric is measures at a first drone and communicated to a second drone. In response to receiving the wind metric, a flight plan of the second drone is modified based on the wind metric.

24 Claims, 6 Drawing Sheets

(56) References Cited

U.S. PATENT DOCUMENTS

| | | | |
|---|---|---|---|
| 2013/0176423 A1* | 7/2013 | Rischmuller | G05D 1/0038 348/114 |
| 2015/0057844 A1* | 2/2015 | Callou | B64C 39/024 701/3 |
| 2015/0370258 A1* | 12/2015 | Fleureau | G05D 1/0088 701/3 |
| 2016/0189549 A1* | 6/2016 | Marcus | G08G 5/0039 701/3 |
| 2018/0244386 A1* | 8/2018 | Phan | G01W 1/08 |
| 2018/0290764 A1* | 10/2018 | McMillian | B64C 39/024 |
| 2018/0292817 A1* | 10/2018 | Yang | G08G 5/0013 |
| 2018/0327091 A1* | 11/2018 | Burks | B64C 39/10 |

* cited by examiner

DRONE OBSTACLE AVOIDANCE USING REAL-TIME WIND ESTIMATION

TECHNICAL FIELD

Embodiments described herein generally relate to flying vehicles and more specifically to drone obstacle avoidance using real-time wind estimation.

BACKGROUND

Drones (e.g., autonomous or human controlled flying vehicles) may have a variety of uses. Example uses may include surveys, inspecting equipment, delivering packages, etc. Due to the generally small size and autonomous control systems, drones may have difficulty maintaining performance or safety margins in adverse conditions, such as wind. For example, in inspection tasks, drones may fly very close to buildings or other structures. A wind gust may push the drone into the structure and cause damage. This danger may be multiplied when, for example, the structure contains a dangerous (e.g., poisonous, corrosive, caustic, or explosive) material.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The value in time and cost savings of using drones for equipment or structure inspection entails solutions to the problem of controlling these vehicles in adverse wind conditions. Some drone users rely upon weather information from third party sources, such as forecasting agencies or the like. Some operators may use a mobile weather station, installed and manned at a drone operating site. The wind data may be used to adjust drone flight paths, cancel operations altogether, or otherwise modify the drone behavior in order to avoid damage to property, wildlife, or people.

A problem that arises when using mobile weather stations includes a lack of accuracy with respect to the drone itself. For example, even if the mobile weather station accurately predicts the wind (e.g., direction, density, or velocity), the measurement is specific to the location, including elevation, of the mobile weather station, and thus does not measure the surrounding wind field that may affect the drones. Using forecasted weather is even less accurate. Thus, drone flight control may still be susceptible to damaging property or hurting people, limiting the value drones may provide.

To address the performance and safety issues present with current drone operations, systems and techniques for measuring the wind field affecting drones, at the drones themselves, is herein described. First, drones may measure the wind field directly by, for example, comparing control outputs used to maintain an orientation against a baseline, or measuring the wind directly via a sensor system, such as Acoustic Doppler Velocimetry (ADV). Using these techniques, each drone may measure the wind acting upon the drone to measure the relevant portion of the wind field. Further, a flight of drones, operating in concert, may use the drone-based wind field measurements (e.g., wind field vectors) and communicate with each other, providing a more complete wind field measurement. These wind field measurements may then be used to modify flight plans to ensure equipment and human safety.

For example, a flight of drones may include an instrument drone, Thus, one of the flight of drones may be a more sophisticated measuring instrument, primarily used to carryout whatever inspection is desired. The instrument drone may be expected to fly near sensitive equipment that should not be damaged. Strong winds could push a drone into this equipment. The remaining drones in the drone flight are smaller, often cheaper, and primarily used to support the larger drone. These support drones may be used to sample the current wind field, taking wind field measurements in three-dimensional (3D) space. Thus, the support drones help to measure the wind field around the inspection volume in which the instrument drone will fly. The wind field results are shared at, for example a central controller or via peer-to-peer communications, to communicate a map of a larger wind field. This map may be used for wind avoidance planning. An example of wind avoidance planning may include automated waypoint planning to compute a path for the instrument drone that minimizes risk to the instrument drone by avoiding areas with winds outside of the instrument drone's operating parameters. In case of an unexpected wind gust, the support drones encounter the gust first, and may update the wind field and communicate the same to the instrument drone before it loses control in the gust. Thus, the instrument drone may be given time to land or navigate into a safe area before it even encounters the wind gust. In some scenarios-such as a very large wind gust, with a much higher force than the design parameters of the instrument drone accounted for—there may not be time to save the instrument drone. That is, no matter which evasive actions are taken, it is likely that the instrument drone will be uncontrollable or fail. In such scenarios, wind avoidance planning may include plotting and following a crash route that is informed by the wind field, to reach a safe crash site.

Using wind estimation at a drone, and combining drones into a flight (e.g., group of drones), may enable greater operating envelopes for drones—e.g., in poorer weather conditions—without compromising safety. Additional details and examples are described below.

Figure 1:
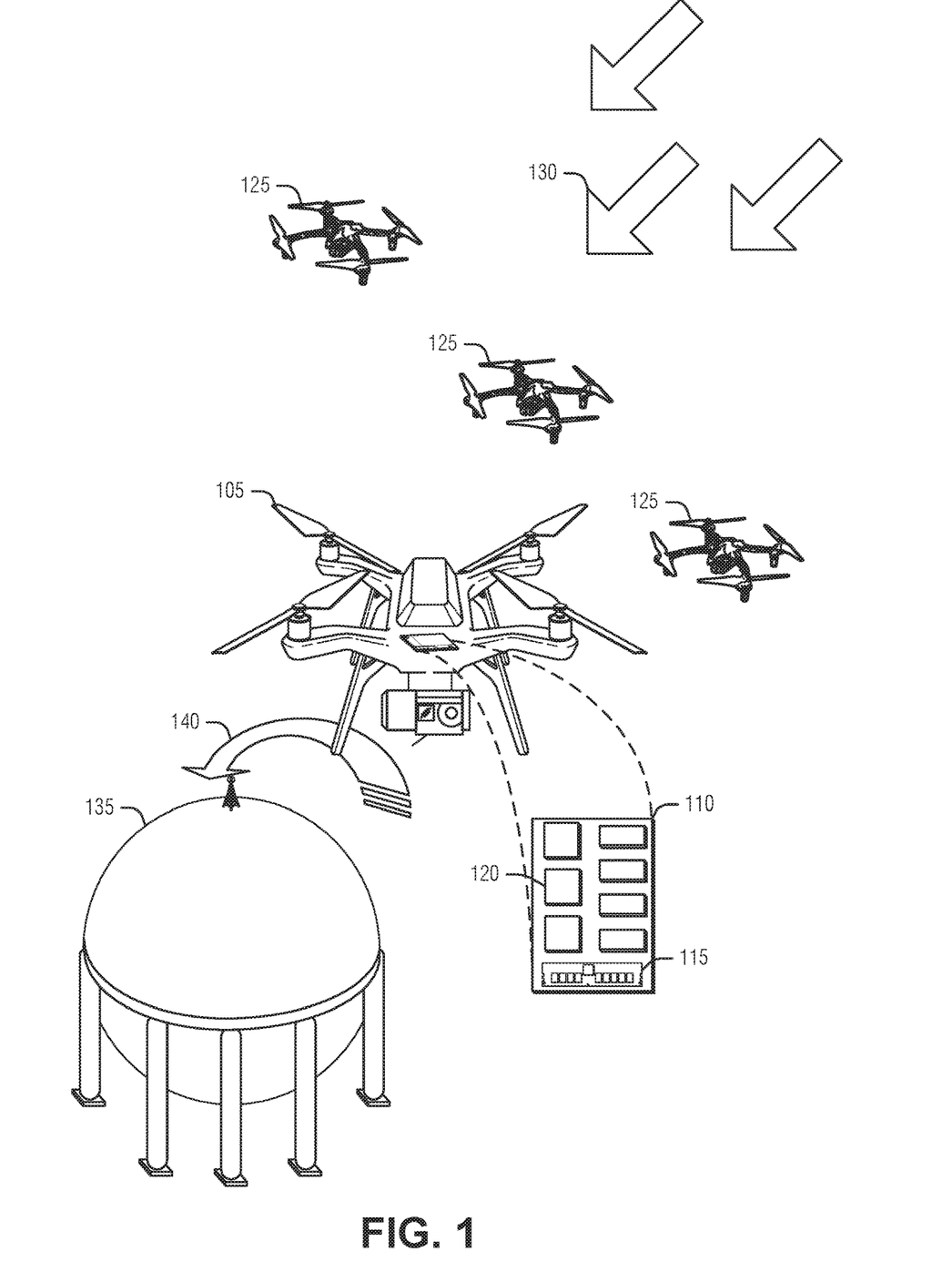
FIG. 1 is a block diagram of an example of an environment including a system for obstacle avoidance using real-time wind estimation, according to an embodiment.

FIG. 1 is a block diagram of an example of an environment including a system for obstacle avoidance using real-time wind estimation, according to an embodiment. The environment includes an observation target 135, such as a chemical storage tank, building, or other equipment. The environment also includes a flight of drones, here illustrated with an instrument drone 105 and support drones 125, operating in a wind field 130. Any or all of the instrument drone 105 and the support drones 125 may include a device 110 to provide real-time wind estimation. The device 110 includes processing circuitry 120 and a machine readable medium 115. The machine readable storage medium 115 includes instructions that direct hardware of the device 110, including the processing circuitry 120, to measure an aspect of the wind field 130. In an example, the instructions also direct the hardware to communicate the measurement or perform obstacle avoidance in accordance with the measurements. For simplicity, the following activities are described as being performed by the processing circuitry 120, although other hardware or components, such as an application specific integrated circuit (ASIC), may be substituted in accordance with hardware design practices.

The processing circuitry 120 is arranged to measure a wind metric. Here, a wind metric is an attribute of the wind field 130, such as direction, speed, density, content, or other feature that may affect the flight of a drone 105 or 125. In an example, the wind metric is measured at a first drone, such as at a support drone 125. In an example, measuring the wind metric includes measuring flight control inputs of the first drone to maintain a flight orientation. The wind metric may then be derived (e.g., calculated based on) the flight control inputs. In an example, the flight control inputs are motor outputs to a plurality of vertically oriented motors of the first drone. In an example, the flight orientation is a hover (e.g., the drone 105 is hovering). These examples use a novel combination of already existing sensors or drivers on the drone with some understanding of flight characteristics in the wind field 130. For example, if a quad-copter drone uses equal power to each rotor to maintain a level hovering orientation, and varies the power to the different rotors to maintain the same orientation in the wind field 130, the difference in driver output to maintain the orientation evidences both the direction and force of the wind field 130. Thus, additional sensors are not needed, and yet the drone may efficiently measure the wind field 130 at the drone.

In an example, to calculate the wind metric, the processing circuitry 120 is arranged to estimate a set of differential equations that use characteristics of the first drone. The set of differential equations provides a model for the wind field 130 using the flight control inputs. That is the equations define a relationship between the flight controls and the wind field 130. Because the flight controls are known, the wind field 130 characteristics may be calculated using the set of differential equations. In an example, characteristics of the first drone may include measured characteristics or intrinsic characteristics. Here, the measured characteristics include thrust generated by the motor outputs (e.g., flight control inputs) or an attitude of the first drone. In an example, the set of differential equations are represented by $\dot{x}=f(\phi, T, g, a)+h(v, \gamma, \phi, b)$. Here, f is a force from the vertically oriented motors to counteract gravity and accelerate the first drone, $\phi$ is the attitude towards the wind, T is a total thrust from the vertically oriented motors, g is gravity, a are the intrinsic characteristics, h is external force from the wind acting on the first drone, v is a velocity of the wind, $\gamma$ is a direction of the wind, and b are aerodynamic characteristics of the first drone.

Differential equations may be complicated to calculate, or only may be realistically calculated using an estimation technique. In an example, estimating the set of differential equations includes providing the motor outputs or the attitude to a trained artificial neural network (ANN). Here, the ANN may be trained on a dataset that includes a plurality of wind velocities and directions and corresponding motor outputs (or other flight control inputs) and attitudes to stabilize the orientation. Here, the training data represents several (e.g., hundreds, thousands, etc.) discrete experiments of wind field variations and flight control inputs to maintain an orientation. The ANN training operates to identify common patterns between flight control inputs and wind field metrics. Thus, while the set of differential equations are not directly calculated using this technique, they result in estimations that conform to the set of differential equations. With the advent of neuromorphic hardware, such ANN estimation techniques may provide a convenient and efficient solution to these complex mathematical relationships.

In an example, the processing circuitry 120 is arranged to measure the wind metric by scanning an area with ADV. ADV, or other light or sound based scanning techniques, may reflect off of material suspended in the wind field 130. Measurements of this material operate as a proxy to measure the wind field 130 itself. In an example, the first drone includes an array of speakers and an array of microphones to implement the scan. Although these techniques add a level of hardware complexity to the drone in the form of additional sensors (e.g., emitters or speakers, and receivers or microphones, etc.), it may be beneficial to measure the wind field 130 away from the drone to provide additional time for the drone to react to changes in the wind field 130.

The processing circuitry 120 is arranged to communicate the wind metric to a second drone. Thus, if the first drone is a support drone 125, the second drone is the instrument drone 105, or another support drone 125. The communication may be direct (e.g., via a broadcast, or peer-to-peer communication paradigm), through a coordinator (e.g., onsite workstation, operator control panel, etc.), or a central coordinator (e.g., via a cloud service). Thus, in an example, the first drone is one of several support (e.g., measurement) drones 125 and the second drone is not a measurement drone (e.g., instrument drone 105). In an example, however the first drone is the second drone. Thus, the first drone defines a measuring drone and the second drone is the flying entity, which may be the same vehicle, such as instrument drone 105. In this example, the communication is from a measurement feature to a navigation or control feature of the instrument drone 105.

In response to receipt of the wind metric, the processing circuitry 120 of the receiving device 110, is arranged to modify 140 a flight plan of the second drone 105 based on the wind metric. In an example, modifying the flight plan 140 includes avoiding a path in which the wind threatens to force the second drone 105 to collide with the obstacle 135 based on the wind metric. Thus, even in relatively high wind situations, an operator may use the instrument drone 105 to inspect sensitive obstacles 135. In addition, additional conditions, such as that created by the passage of aircraft, may be measured and addressed in flight plans. In an example, modifying the flight plan includes avoiding wake turbulence from another aircraft.

The described real-time wind estimation leverages drones to achieve accurate and relevant wind field 130 measurements for a flight of drones. These measurements may then enable more accurate and safe operation of the drones to achieve a variety of tasks, such as inspecting structures, even in adverse weather conditions.

Figure 2A:
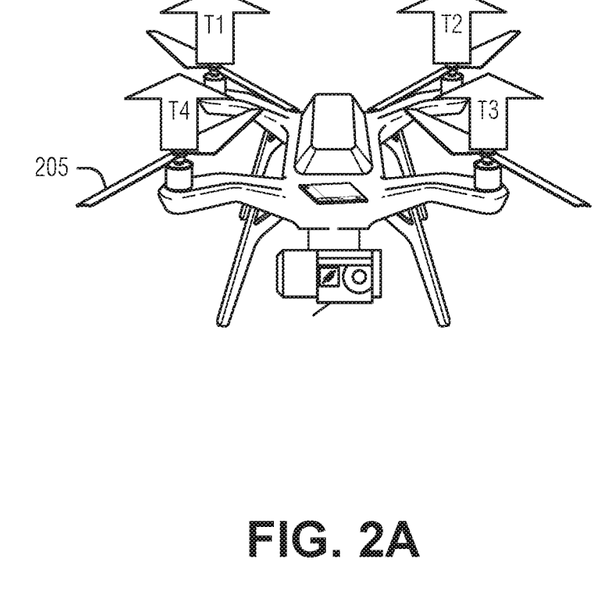
FIGS. 2A and 2B illustrates illustrate example thrust vectors under differing wind conditions, according to an embodiment.
Figure 2B:
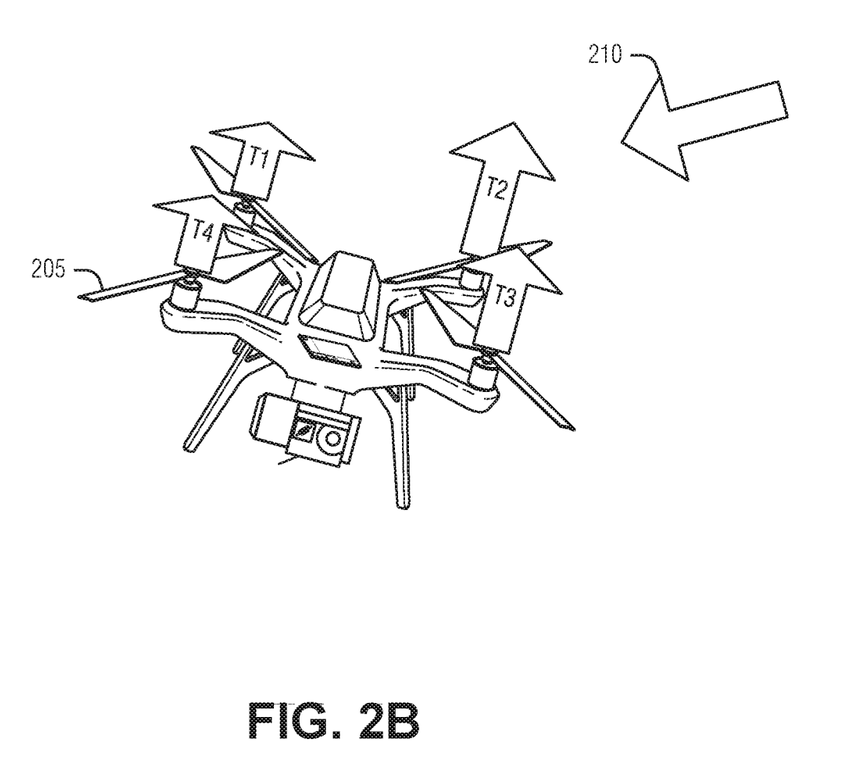

FIGS. 2A and 2B illustrates illustrate example thrust vectors under differing wind conditions, according to an embodiment. FIG. 2A shows a quadcopter 205 drone maintaining a hover flight orientation in no, or negligible, wind

210. Note that the thrust vectors (T1-T4) for the rotors are equal. FIG. 2B illustrates the quadcopter 205 in the wind 210. Note that the thrust vectors are no longer equal to maintain the hover orientation. The trust vectors represent flight control inputs that may be used to estimate a metric of the wind 210.

The behavior of the quadcopter 205 in three dimensions, along with its orientation, may be represented mathematically by a set of differential equations as follows:

$$\dot{x} = f(\phi, T, g, a) + h(v, \gamma, \phi, b)$$

where $\dot{x}$ w is a vector representing the position in 3D space, f represents a force from the vertically oriented motors to counteract gravity and accelerate the first drone. f is a function of: $\phi$, the attitude of the quadcopter 205 towards the wind 210; T, total thrust from the vertically oriented motors; g, gravity; a, intrinsic characteristics of the quadcopter 205 (e.g., mass, drag, etc.). h represents the external force from the wind 210 acting on quadcopter 205, and is a function of: v, velocity of the wind 210; $\gamma$, direction of the wind 210; $\phi$; and b, aerodynamic characteristics of the quadcopter 205.

Although solving the set of differential equations may directly lead to metrics for the wind 210, it is often untenable given time and processing constraints on the quadcopter 205. Further, unless it is computed in real-time, the computation may be of little value. To address these issues, an estimation of the wind 210 is made. For example, assume that any time wind 210 speed is measured, the flight controller onboard the quadcopter 205 is capable of maintaining at least a momentary stable hover. Here, the velocity and acceleration of the quadcopter 205 are zero for the duration of the test. Also, assume that the force of gravity and the ambient environmental properties, such as air temperature, humidity, or density are known and remain constant during the test. In this scenario, a mapping of the remaining variables—such as the pitch angle or total thrust—to the wind 210 speed or the wind 210 direction will yield the wind 210 metric acting on the quadcopter 205.

One such mapping technique includes ANNs. That is, machine learning may be used to determine the desired mapping between flight control inputs, intrinsic quadcopter 205 values (e.g., drag, lift, mass, etc.), and the wind 210. Specifically, given the behavior quadcopter 205 (or other type of drone such as a hexacopter, fixed wing, etc.) in a simulated wind field with variations in wind 210 speed and wind 210 direction, the flight control inputs to maintain the hovering may be recorded to produce a training data set. Machine learning is then used to train a model to estimate the wind 210 as a function of the measured pitch angle and the total thrust used to stabilize the quadcopter 205 in a wind 210 field.

The effectiveness of the machine learning technique has been verified in a simulation of a drone 205 under varying conditions, with a wind 210 speed from one to twenty meters-per-second (m/s) and a wind 210 direction between $-\pi/2$ and $\pi/2$ radians. Here, a wind 210 direction of zero degrees corresponds to the wind flowing parallel to the horizontal plane while ninety degrees corresponds to a downward flow, parallel to the vertical plane. The drone 205 in the simulation attempted to hover in place, resisting the wind 210 by controlling its pose (e.g., flight orientation) and the thrust from the propellers. A normalized pose corresponding to ten consecutive samples for each wind 210 direction and wind 210 velocity pair, after the drone 205 had stabilized, was captured as training data. The machine learning model learned to estimate the wind 210 using half of the data points from the simulation by employing a nearest neighbor algorithm of length two. The generated model predicted the wind 210 speed and wind 210 direction given the total thrust and the pose of the drone 205. The drone 205 pose may be obtained in practice using an inertial measurement unit (IMU). Thus, the drone 205 controller flight control inputs (e.g., thrust to rotors) is all that is used to determine an estimate of the wind 210 metric.

Figure 3:
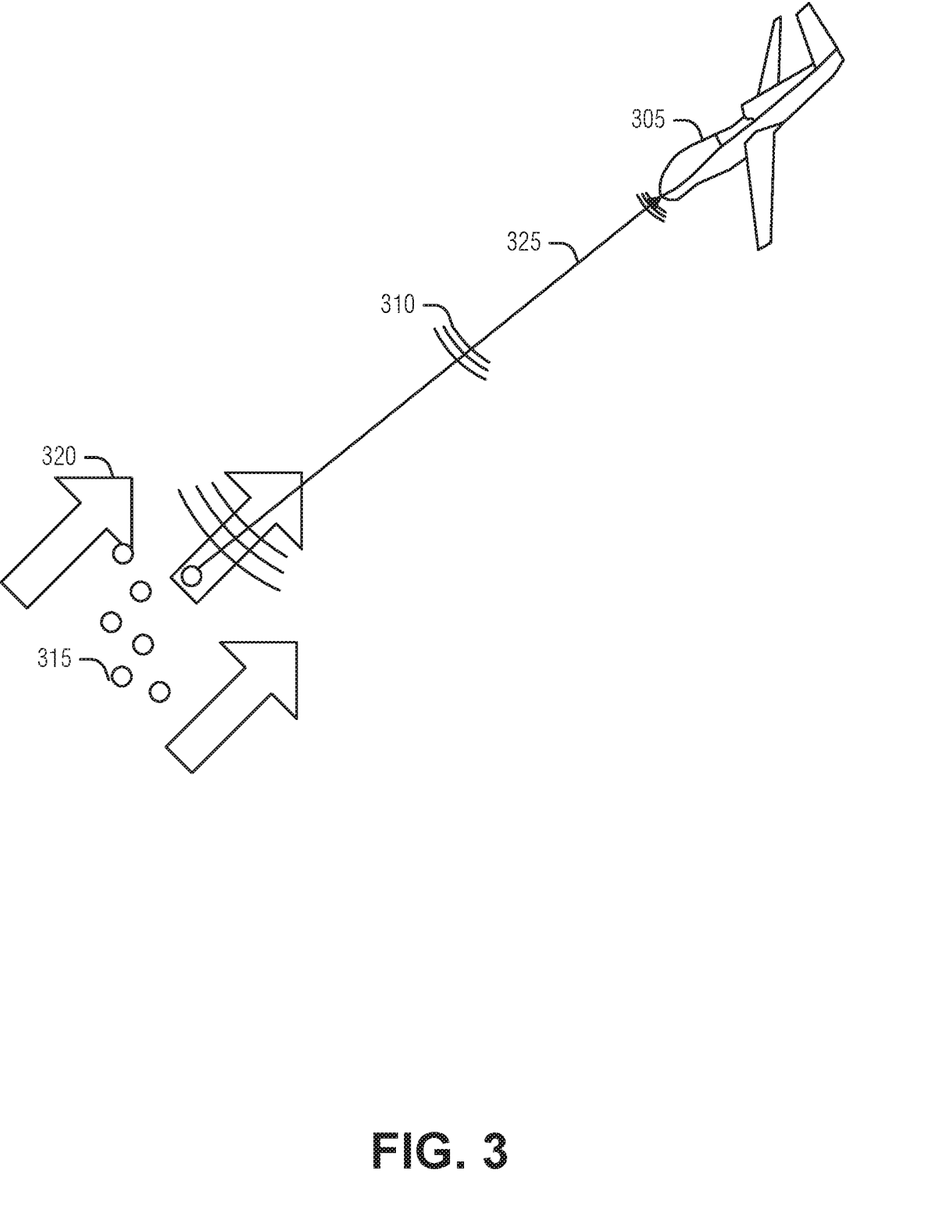
FIG. 3 illustrates an example of using Acoustic Doppler Velocimetry (ADV) to estimate wind, according to an embodiment.

FIG. 3 illustrates an example of using Acoustic Doppler Velocimetry (ADV) to estimate wind 320, according to an embodiment. Here, the drone 305 uses ADV, also known as duplex ultrasonography, to measure the relative speed of the wind 320 with respect to the drone 305. ADV provides instantaneous velocity components at a single-point with a relatively high frequency. Measurements are performed by measuring the velocity of particles 315 in a remote sampling volume based upon the Doppler shift of emissions 310 and their reflections 325 back to the drone 305. Thus, a change in frequency (e.g., wavelength) between the emissions 310 and the reflections 325 provide a relative velocity measurement of the particles 315 with respect to the drone 305.

To implement ADV, the drone 305 includes an emitter (e.g., speaker) and a receiver (e.g., microphone). The drone 305 sends out a wave 310 and records what comes to the drone 305 from that wave through reflections 325 off of dust and particles 315 in the wind 320. In an example, to improve results, an array of emitters and receivers may be used.

Because the measurements are relative to the drone 305, drone 305 flight characteristics—such as direction, orientation, velocity, etc., which may be captured by on-board positional sensors (e.g. an IMU, global positioning system (GPS), visual odometry, etc.)—may be combined with the relative velocity measurement to accurately measure the wind 320 metric such that it may be used by other drones.

Figure 4A:
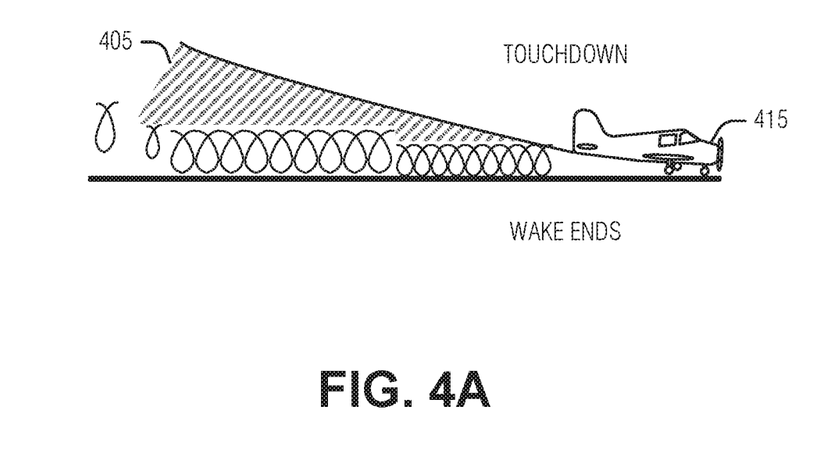
FIGS. 4A and 4B illustrate a use case for real-time wind estimation, where the wind is turbulence caused by aircraft, according to an embodiment.
Figure 4B:
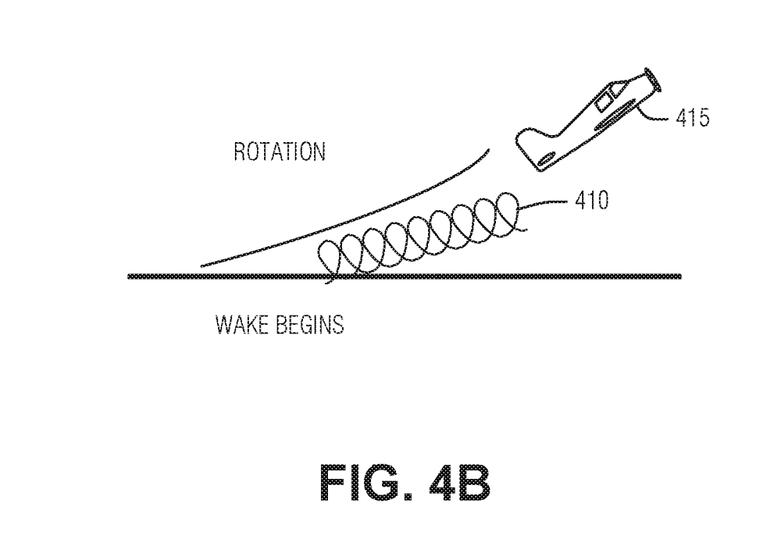

FIGS. 4A and 4B illustrate a use case for real-time wind estimation, where the wind is turbulence 405 and 410 caused by aircraft 415, according to an embodiment. Wake turbulence is a form of air disruption caused by a sufficiently large object moving through the air. Generally, the turbulence is sensitive to time, dispersing after a period of time. The two cases of turbulence with aircraft that often occur are landing wake turbulence 405 and take-off wake turbulence 410, respectively occurring when the aircraft 415 lands or takes-off. This is an interesting use case for precise wind measurements at, for example, busy airports. Specifically, a flight of drones may be employed to measure the wake turbulence 405 or 410 of the aircraft 415 in order to provide timing to air traffic controllers, or the like, who are directing other aircraft and attempting to avoid the turbulence 405 or 410. This may lead to closer arrival or take-off slots for aircraft, increasing throughput at airports.

Figure 5:
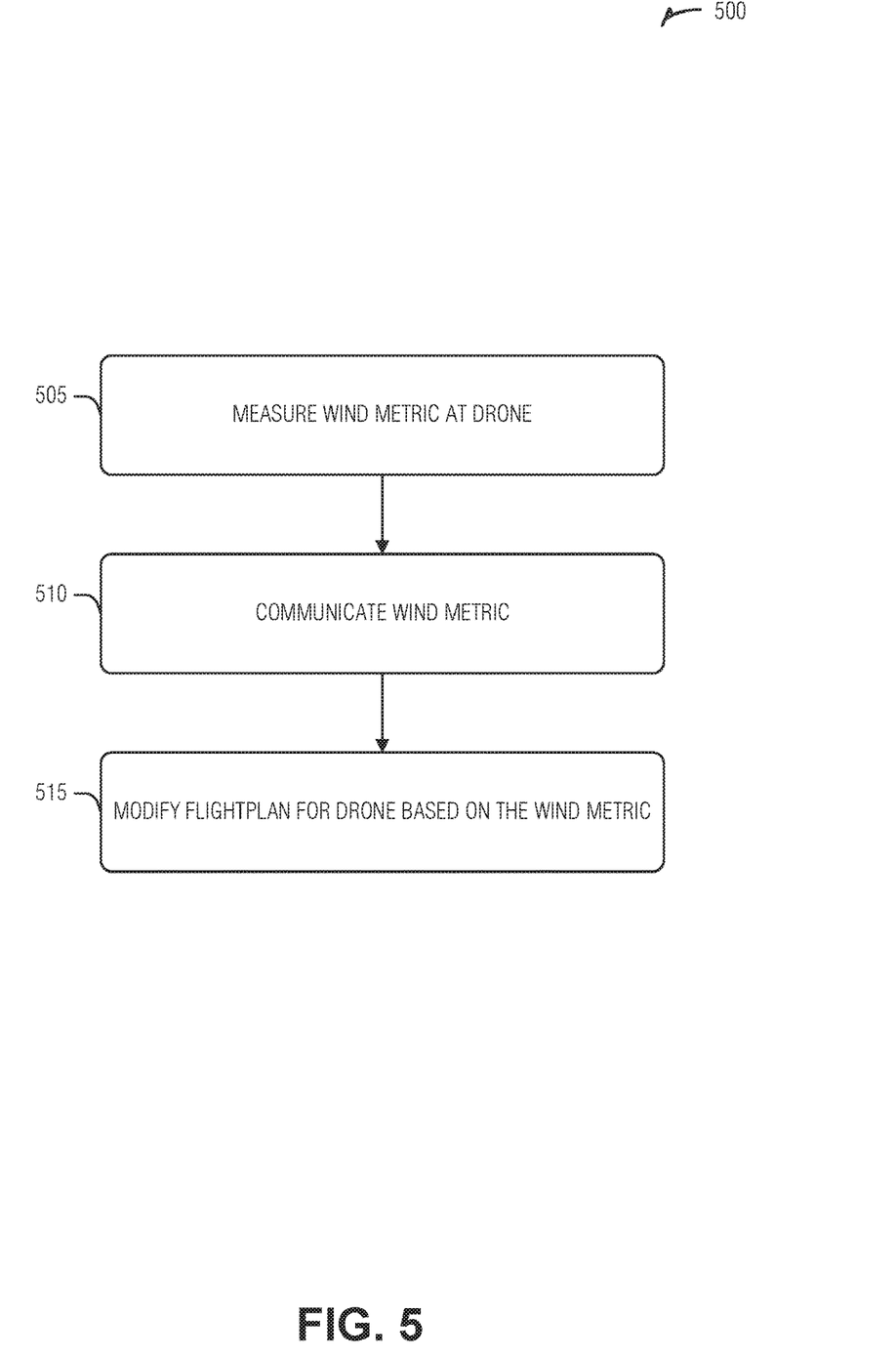
FIG. 5 illustrates a flow diagram of an example of a method for drone obstacle avoidance using real-time wind estimation, according to an embodiment.

FIG. 5 illustrates a flow diagram of an example of a method 500 for drone obstacle avoidance using real-time wind estimation, according to an embodiment. The operations of the method 500 are performed by hardware, such as that described above or below (e.g., processing circuitry).

At operation 505, a wind metric is measured at a first drone. In an example, measuring the wind metric at the first drone includes measuring flight control inputs of the first drone to maintain a flight orientation for the first drone, and calculating the wind metric based on the flight control inputs. In an example, the flight control inputs are motor outputs to a plurality of vertically oriented motors of the first drone. In an example, the flight orientation is a hover.

In an example, calculating the wind metric includes estimating a set of differential equations that use characteristics of the first drone. These characteristics may include measured characteristics or intrinsic characteristics. Here, the measured characteristics include thrust generated by the motor outputs or an attitude of the first drone. In an example, the set of differential equations are represented by $\dot{x}=f(\phi, T, g, a)+h(v, \gamma, \phi, b)$. Here, f is a force from the vertically oriented motors to counteract gravity and accelerate the first drone, $\phi$ is the attitude towards the wind, T is a total thrust from the vertically oriented motors, g is gravity, a are the intrinsic characteristics, h is external force from the wind acting on the first drone, v is a velocity of the wind, $\gamma$ is a direction of the wind, and b are aerodynamic characteristics of the first drone. In an example, estimating the set of differential equations includes providing the motor outputs or the attitude to an artificial neural network trained on a dataset that includes: a plurality of wind velocities and directions, and corresponding motor outputs and attitudes to stabilize the orientation.

In an example, measuring the wind metric includes scanning an area with ADV. In an example, the first drone includes an array of speakers and an array of microphones to implement the scan.

At operation 510, the wind metric is communicated to a second drone. In an example, the first drone is the second drone. In an example, the first drone is one of several measurement drones and the second drone is not a measurement drone.

At operation 515, in response to receipt of the wind metric, a flight plan of the second drone is modified based on the wind metric. In an example, modifying the flight plan includes avoiding a path in which the wind threatens to force the second drone to collide with an obstacle based on the wind metric. In an example, modifying the flight plan includes avoiding wake turbulence from another aircraft.

Figure 6:
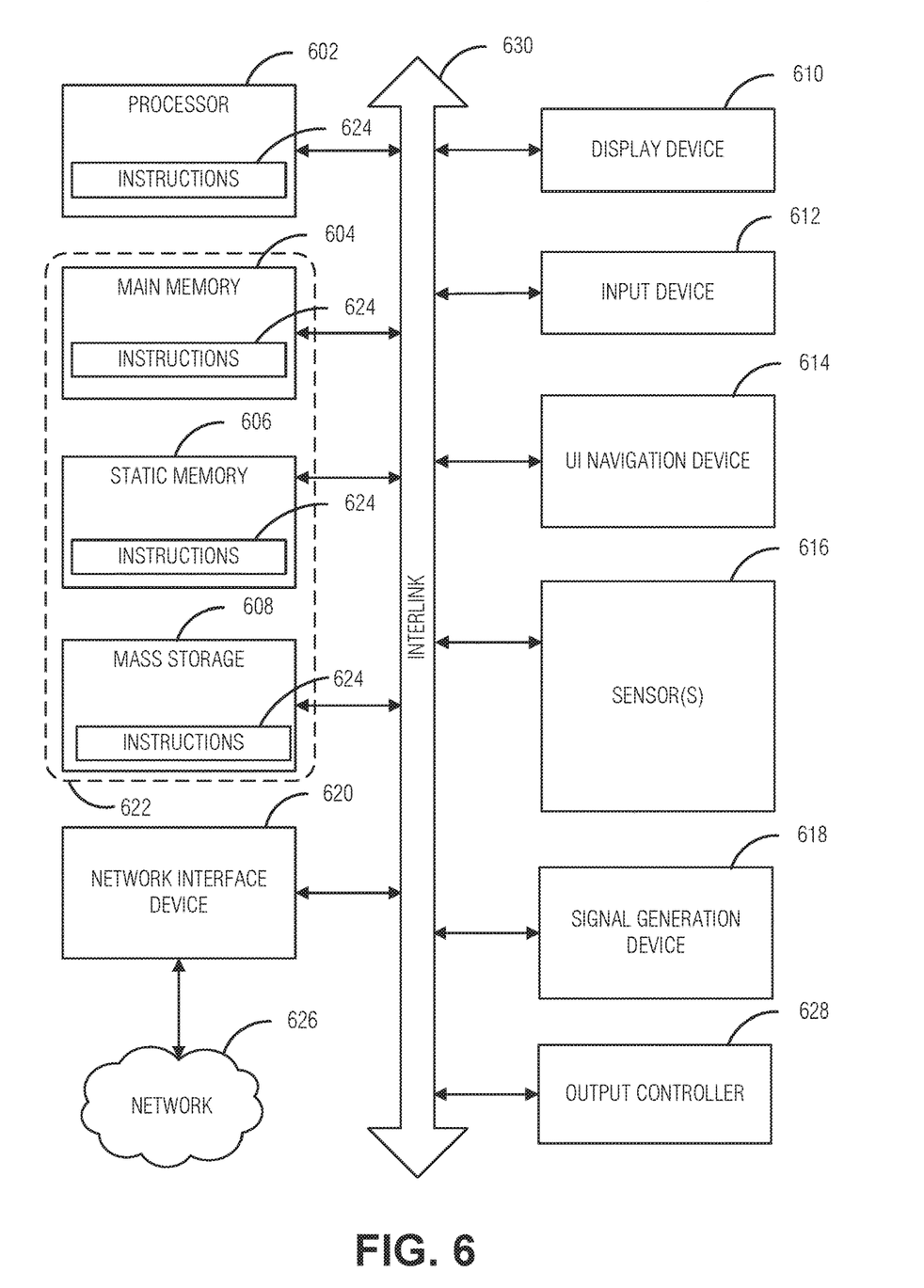
FIG. 6 is a block diagram illustrating an example of a machine upon which one or more embodiments may be implemented.

FIG. 6 illustrates a block diagram of an example machine 600 upon which any one or more of the techniques (e.g., methodologies) discussed herein may perform. Examples, as described herein, may include, or may operate by, logic or a number of components, or mechanisms in the machine 600. Circuitry (e.g., processing circuitry) is a collection of circuits implemented in tangible entities of the machine 600 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 600 follow.

In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 600 may include a hardware processor 602 (e.g., a central processing unit (CPU), a graphics processing unit (GPU), a hardware processor core, or any combination thereof), a main memory 604, a static memory (e.g., memory or storage for firmware, microcode, a basic-input-output (BIOS), unified extensible firmware interface (UEFI), etc.) 606, and mass storage 608 (e.g., hard drive, tape drive, flash storage, or other block devices) some or all of which may communicate with each other via an interlink (e.g., bus) 630. The machine 600 may further include a display unit 610, an alphanumeric input device 612 (e.g., a keyboard), and a user interface (UI) navigation device 614 (e.g., a mouse). In an example, the display unit 610, input device 612 and UI navigation device 614 may be a touch screen display. The machine 600 may additionally include a storage device (e.g., drive unit) 608, a signal generation device 618 (e.g., a speaker), a network interface device 620, and one or more sensors 616, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 602, the main memory 604, the static memory 606, or the mass storage 608 may be, or include, a machine readable medium 622 on which is stored one or more sets of data structures or instructions 624 (e.g., software) embodying or utilized by any one or more of the techniques or functions described herein. The instructions 624 may also reside, completely or at least partially, within any of registers of the processor 602, the main memory 604, the static memory 606, or the mass storage 608 during execution thereof by the machine 600. In an example, one or any combination of the hardware processor 602, the main memory 604, the static memory 606, or the mass storage 608 may constitute the machine readable media 622. While the machine readable medium 622 is illustrated as a single medium, the term "machine readable medium" may include a single medium or multiple media (e.g., a centralized or distributed database, and/or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 may be further transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software. A transmission medium is a machine readable medium.

ADDITIONAL NOTES & EXAMPLES

Example 1 is a device for drone obstacle avoidance using real-time wind estimation, the device comprising: processing circuitry; and machine readable media including instructions that, when executed by the processing circuitry, cause the processing circuitry to: measure a wind metric at a first drone; communicate the wind metric to a second drone; and modify, in response to receipt of the wind metric, a flight plan of the second drone based on the wind metric.

In Example 2, the subject matter of Example 1, wherein, to measure the wind metric at the first drone, the processing circuitry: measures flight control inputs of the first drone to maintain a flight orientation for the first drone; and calculates the wind metric based on the flight control inputs.

In Example 3, the subject matter of Example 2, wherein the flight control inputs are motor outputs to a plurality of vertically oriented motors of the first drone.

In Example 4, the subject matter of Example 3, wherein the flight orientation is a hover.

In Example 5, the subject matter of Example 4, wherein, to calculate the wind metric, the processing circuitry estimates a set of differential equations that use characteristics of the first drone including measured characteristics and intrinsic characteristics, the measured characteristics including thrust generated by the motor outputs and attitude of the first drone.

In Example 6, the subject matter of Example 5, wherein the set of differential equations are represented by $\dot{x}=f(\phi, T, g, a)+h(v, \gamma, \phi, b)$, where f is a force from the vertically oriented motors to counteract gravity and accelerate the first drone, $\phi$ is the attitude towards the wind, T is a total thrust from the vertically oriented motors, g is gravity, a are the intrinsic characteristics, h is external force from the wind acting on the first drone, v is a velocity of the wind, $\gamma$ is a direction of the wind, and b are aerodynamic characteristics of the first drone.

In Example 7, the subject matter of any of Examples 5-6, wherein, to estimate the set of differential equations, the processing circuitry provides the motor outputs and the attitude to an artificial neural network trained on a dataset that includes a plurality of wind velocities and directions, and corresponding motor outputs and attitudes to stabilize the orientation.

In Example 8, the subject matter of any of Examples 1-7, wherein, to measure the wind metric, the processing circuitry scans an area with Acoustic Doppler Velocimetry (ADV).

In Example 9, the subject matter of Example 8, wherein the first drone includes an array of speakers and an array of microphones to implement ADV.

In Example 10, the subject matter of any of Examples 1-9, wherein the first drone is the second drone.

In Example 11, the subject matter of any of Examples 1-10, wherein the first drone is one of several measurement drones and the second drone is not a measurement drone.

In Example 12, the subject matter of any of Examples 1-11, wherein, to modify the flight plan, the processing circuitry avoids a path in which the wind threatens to force the second drone to collide with an obstacle based on the wind metric.

In Example 13, the subject matter of any of Examples 1-12, wherein, to modify the flight plan, the processing circuitry avoids wake turbulence from another aircraft.

Example 14 is a method for drone obstacle avoidance using real-time wind estimation, the method comprising: measuring a wind metric at a first drone; communicating the wind metric to a second drone; and modifying, in response to receipt of the wind metric, a flight plan of the second drone based on the wind metric.

In Example 15, the subject matter of Example 14, wherein measuring the wind metric at the first drone includes: measuring flight control inputs of the first drone to maintain a flight orientation for the first drone; and calculating the wind metric based on the flight control inputs.

In Example 16, the subject matter of Example 15, wherein the flight control inputs are motor outputs to a plurality of vertically oriented motors of the first drone.

In Example 17, the subject matter of Example 16, wherein the flight orientation is a hover.

In Example 18, the subject matter of Example 17, wherein calculating the wind metric includes estimating a set of differential equations that use characteristics of the first drone including measured characteristics and intrinsic characteristics, the measured characteristics including thrust generated by the motor outputs and attitude of the first drone.

In Example 19, the subject matter of Example 18, wherein the set of differential equations are represented by $\dot{x}=f(\phi, T, g, a)+h(v, \gamma, \phi, b)$, where f is a force from the vertically oriented motors to counteract gravity and accelerate the first drone, $\phi$ is the attitude towards the wind, T is a total thrust from the vertically oriented motors, g is gravity, a are the intrinsic characteristics, h is external force from the wind acting on the first drone, v is a velocity of the wind, $\gamma$ is a direction of the wind, and b are aerodynamic characteristics of the first drone.

In Example 20, the subject matter of any of Examples 18-19, wherein estimating the set of differential equations includes providing the motor outputs and the attitude to an artificial neural network trained on a dataset that includes a plurality of wind velocities and directions, and corresponding motor outputs and attitudes to stabilize the orientation.

In Example 21, the subject matter of any of Examples 14-20, wherein measuring the wind metric includes scanning an area with Acoustic Doppler Velocimetry (ADV).

In Example 22, the subject matter of Example 21, wherein the first drone includes an array of speakers and an array of microphones to implement ADV.

In Example 23, the subject matter of any of Examples 14-22, wherein the first drone is the second drone.

In Example 24, the subject matter of any of Examples 14-23, wherein the first drone is one of several measurement drones and the second drone is not a measurement drone.

In Example 25, the subject matter of any of Examples 14-24, wherein modifying the flight plan includes avoiding a path in which the wind threatens to force the second drone to collide with an obstacle based on the wind metric.

In Example 26, the subject matter of any of Examples 14-25, wherein modifying the flight plan includes avoiding wake turbulence from another aircraft.

Example 27 is at least one machine readable medium including instructions for drone obstacle avoidance using real-time wind estimation, the instructions, when executed by a machine, cause the machine to perform operations comprising: measuring a wind metric at a first drone; communicating the wind metric to a second drone: and modifying, in response to receipt of the wind metric, a flight plan of the second drone based on the wind metric.

In Example 28, the subject matter of Example 27, wherein measuring the wind metric at the first drone includes: measuring flight control inputs of the first drone to maintain a flight orientation for the first drone; and calculating the wind metric based on the flight control inputs.

In Example 29, the subject matter of Example 28, wherein the flight control inputs are motor outputs to a plurality of vertically oriented motors of the first drone.

In Example 30, the subject matter of Example 29, wherein the flight orientation is a hover.

In Example 31, the subject matter of Example 30, wherein calculating the wind metric includes estimating a set of differential equations that use characteristics of the first drone including measured characteristics and intrinsic characteristics, the measured characteristics including thrust generated by the motor outputs and attitude of the first drone.

In Example 32, the subject matter of Example 31, wherein the set of differential equations are represented by $\dot{x}=f(\phi, T, g, a)+h(v, \gamma, \phi, b)$, where f is a force from the vertically oriented motors to counteract gravity and accelerate the first drone, $\phi$ is the attitude towards the wind, T is a total thrust from the vertically oriented motors, g is gravity, a are the intrinsic characteristics, h is external force from the wind acting on the first drone, v is a velocity of the wind, $\gamma$ is a direction of the wind, and b are aerodynamic characteristics of the first drone.

In Example 33, the subject matter of any of Examples 31-32, wherein estimating the set of differential equations includes providing the motor outputs and the attitude to an artificial neural network trained on a dataset that includes a plurality of wind velocities and directions, and corresponding motor outputs and attitudes to stabilize the orientation.

In Example 34, the subject matter of any of Examples 27-33, wherein measuring the wind metric includes scanning an area with Acoustic Doppler Velocimetry (ADV).

In Example 35, the subject matter of Example 34, wherein the first drone includes an array of speakers and an array of microphones to implement ADV.

In Example 36, the subject matter of any of Examples 27-35, wherein the first drone is the second drone.

In Example 37, the subject matter of any of Examples 27-36, wherein the first drone is one of several measurement drones and the second drone is not a measurement drone.

In Example 38, the subject matter of any of Examples 27-37, wherein modifying the flight plan includes avoiding a path in which the wind threatens to force the second drone to collide with an obstacle based on the wind metric.

In Example 39, the subject matter of any of Examples 27-38, wherein modifying the flight plan includes avoiding wake turbulence from another aircraft.

Example 40 is a system for drone obstacle avoidance using real-time wind estimation, the system comprising: means for measuring a wind metric at a first drone; means for communicating the wind metric to a second drone: and means for modifying, in response to receipt of the wind metric, a flight plan of the second drone based on the wind metric.

In Example 41, the subject matter of Example 40, wherein the means for measuring the wind metric at the first drone include: means for measuring flight control inputs of the first drone to maintain a flight orientation for the first drone; and means for calculating the wind metric based on the flight control inputs.

In Example 42, the subject matter of Example 41, wherein the flight control inputs are motor outputs to a plurality of vertically oriented motors of the first drone.

In Example 43, the subject matter of Example 42, wherein the flight orientation is a hover.

In Example 44, the subject matter of Example 43, wherein the means for calculating the wind metric include means for estimating a set of differential equations that use characteristics of the first drone including measured characteristics and intrinsic characteristics, the measured characteristics including thrust generated by the motor outputs and attitude of the first drone.

In Example 45, the subject matter of Example 44, wherein the set of differential equations are represented by $\dot{x}=f(\phi, T, g, a)+h(v, \gamma, \phi, b)$, where f is a force from the vertically oriented motors to counteract gravity and accelerate the first drone, $\phi$ is the attitude towards the wind, T is a total thrust from the vertically oriented motors, g is gravity, a are the intrinsic characteristics, h is external force from the wind acting on the first drone, v is a velocity of the wind, γ is a direction of the wind, and b are aerodynamic characteristics of the first drone.

In Example 46, the subject matter of any of Examples 44-45, wherein the means for estimating the set of differential equations include means for providing the motor outputs and the attitude to an artificial neural network trained on a dataset that includes a plurality of wind velocities and directions, and corresponding motor outputs and attitudes to stabilize the orientation.

In Example 47, the subject matter of any of Examples 40-46, wherein the means for measuring the wind metric include means for scanning an area with Acoustic Doppler Velocimetry (ADV).

In Example 48, the subject matter of Example 47, wherein the first drone includes an array of speakers and an array of microphones to implement ADV.

In Example 49, the subject matter of any of Examples 40-48, wherein the first drone is the second drone.

In Example 50, the subject matter of any of Examples 40-49, wherein the first drone is one of several measurement drones and the second drone is not a measurement drone.

In Example 51, the subject matter of any of Examples 40-50, wherein the means for modifying the flight plan include means for avoiding a path in which the wind threatens to force the second drone to collide with an obstacle based on the wind metric.

In Example 52, the subject matter of any of Examples 40-51, wherein the means for modifying the flight plan include means for avoiding wake turbulence from another aircraft.

Example 53 is at least one machine-readable medium including instructions that, when executed by processing circuitry, cause the processing circuitry to perform operations to implement of any of Examples 1-52.

Example 54 is an apparatus comprising means to implement of any of Examples 1-52.

Example 55 is a system to implement of any of Examples 1-52.

Example 56 is a method to implement of any of Examples 1-52.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document: for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

The invention claimed is:

1. A device for drone obstacle avoidance using real-time wind estimation, the device comprising:
   processing circuitry; and
   non-transitor machine readable media including instructions that, when executed by the processing circuitry, cause the processing circuitry to:
   receive a set of wind metrics measured by several support drones operating in a three-dimensional wind field;
   model the wind field by estimation of a set of differential equations based on the set of wind metrics received from the several support drones, wherein the estimation of the set of differential equations use characteristics of the several support drones including measured characteristics and intrinsic characteristics, the measured characteristics including thrust generated by the motor outputs and attitude of a drone; and
   modify, a flight plan through the wind field based on the modeled wind field.

2. The device of claim 1, wherein the wind metrics are measured by the several support drones by each of the several support drones being configured to:
   measure flight control inputs to maintain a flight orientation for; and
   calculate a wind metric based on the flight control inputs.

3. The device of claim 2, wherein the flight control inputs are motor outputs to a plurality of vertically oriented motors.

4. The device of claim 3, wherein the flight orientation is a hover.

5. The device of claim 1, wherein the set of differential equations are represented by $\dot{x}=f(\phi, T, g, a)+h(v, \gamma, \phi, b)$, where f is a force from the vertically oriented motors to counteract gravity and accelerate, $\phi$ is the attitude towards the wind, T is a total thrust from the vertically oriented motors, g is gravity, a are the intrinsic characteristics, h is external force from the wind acting, v is a velocity of the wind, $\gamma$ is a direction of the wind, and b are aerodynamic characteristics.

6. The device of claim 1, wherein, estimation of the set of differential equations includes providing, motor outputs and attitude of the several support drones are provided to an artificial neural network trained on a dataset that includes a plurality of wind velocities and directions, and corresponding motor outputs and attitudes to stabilize the orientation.

7. The device of claim 1, wherein, to modify the flight plan, a path in which the wind field threatens to force a collision with an obstacle is avoided.

8. The device of claim 1, wherein the wind field includes wake turbulence of an aircraft, and wherein the flight plan is modified to avoid the wake turbulence.

9. A method for drone obstacle avoidance using real-time wind estimation, the method comprising:
receiving a set of wind metrics measured by several support drones operating in a three-dimensional wind field;
modeling the wind field by estimation of a set of differential equations based on the set of wind metrics received from the several support drones, wherein the estimation of the set of differential equations use characteristics of the several support drones including measured characteristics and intrinsic characteristics, the measured characteristics including thrust generated by motor outputs and attitude of a drone; and
modifying a flight plan through the wind field based on the modeled wind field.

10. The method of claim 9, wherein, to measure the wind metrics, each of the several support drones:
measures flight control inputs of the first drone to maintain a flight orientation for the first drone: and
calculates the wind metric based on the flight control inputs.

11. The method of claim 10, wherein the flight control inputs are motor outputs to a plurality of vertically oriented motors.

12. The method of claim 11, wherein the flight orientation is a hover.

13. The method of claim 9, wherein the set of differential equations are represented by $\dot{x}=f(\phi, T, g, a)+h(v, \gamma, \phi, b)$, where f is a force from the vertically oriented motors to counteract gravity and accelerate, $\phi$ is the attitude towards the wind, T is a total thrust from the vertically oriented motors, g is gravity, a are the intrinsic characteristics, h is external force from the wind acting, v is a velocity of the wind, $\gamma$ is a direction of the wind, and b are aerodynamic characteristics.

14. The method of claim 9, wherein estimation of the set of differential equations includes providing motor outputs and attitude of the several support drones to an artificial neural network trained on a dataset that includes a plurality of wind velocities and directions, and corresponding motor outputs and attitudes to stabilize the orientation.

15. The method of claim 9, wherein modifying the flight plan includes avoiding a path in which the wind field threatens to force a collision with an obstacle.

16. The method of claim 9, wherein the wind field includes wake turbulence of an aircraft, and wherein the flight plan is modified to avoid the wake turbulence.

17. At least one non-transitory machine readable medium including instructions for drone obstacle avoidance using real-time wind estimation, the instructions, when executed by a machine, cause the machine to perform operations comprising:
receiving a set of wind metrics measured by several support drones operating in a three-dimensional wind field;
modeling the wind field by estimation of a set of differential equations based on the set of wind metrics received from the several support drones, wherein the estimation of the set of differential equations use characteristics of the several support drones including measured characteristics and intrinsic characteristics, the measured characteristics including thrust generated by motor outputs and attitude of a drone; and
modifying a flight plan through the wind field based on the modeled wind field.

18. The at least one non-transitory machine readable medium of claim 17, wherein, to measure the wind metrics, each of the several support drones:
measures flight control inputs of the first drone to maintain flight orientation for the first drone; and
calculates the wind metric based on the flight control inputs.

19. The at least one non-transitory machine readable medium of claim 18, wherein the flight control inputs are motor outputs to a plurality of vertically oriented motors.

20. The at least one non-transitory machine readable medium of claim 19, wherein the flight orientation is a hover.

21. The at least one non-transitory machine readable medium of claim 17, wherein the set of differential equations are represented by $\dot{x}=f(\phi, T, g, a)+h(v, \gamma, \phi, b)$, where f is a force from the vertically oriented motors to counteract gravity and accelerate, $\phi$ is the attitude towards the wind, T is a total thrust from the vertically oriented motors, g is gravity, a are the intrinsic characteristics, h is external force from the wind acting, v is a velocity of the wind, $\gamma$ is a direction of the wind, and b are aerodynamic characteristics.

22. The at least one non-transitory machine readable medium of claim 17, wherein estimation of the set of differential equations includes providing motor outputs and attitude of the several support drones to an artificial neural network trained on a dataset that includes a plurality of wind velocities and directions, and corresponding motor outputs and attitudes to stabilize the orientation.

23. The at least one non-transitory machine readable medium of claim 17, wherein modifying the flight plan includes avoiding a path in which the wind field threatens to force a collision with an obstacle.

24. The at least one non-transitory machine readable medium of claim 17, wherein the wind field includes wake turbulence of an aircraft, and wherein the flight plan is modified to avoid the wake turbulence.

* * * * *

UNITED STATES PATENT AND TRADEMARK OFFICE
CERTIFICATE OF CORRECTION

PATENT NO. : 10,909,864 B2
APPLICATION NO. : 16/020338
DATED : February 2, 2021
INVENTOR(S) : De La Guardia Gonzalez et al.

Page 1 of 1

It is certified that error appears in the above-identified patent and that said Letters Patent is hereby corrected as shown below:

In the Claims

In Column 14, Line 41, in Claim 1, delete "non-transitor" and insert --non-transitory-- therefor In Column 14, Line 56, in Claim 1, delete "modify," and insert --modify-- therefor In Column 15, Line 11, in Claim 6, delete "providing," and insert --providing-- therefor In Column 15, Line 40, in Claim 10, delete "drone:" and insert --drone;-- therefor In Column 16, Line 29, in Claim 18, before "flight", insert --a--

Signed and Sealed this
Sixth Day of April, 2021

Drew Hirshfeld
*Performing the Functions and Duties of the
Under Secretary of Commerce for Intellectual Property and
Director of the United States Patent and Trademark Office*